United States Patent
Takahashi et al.

(10) Patent No.: US 9,607,359 B2
(45) Date of Patent: Mar. 28, 2017

(54) ELECTRONIC DEVICE, METHOD, AND COMPUTER PROGRAM PRODUCT

(71) Applicant: Kabushiki Kaisha Toshiba, Minato-ku, Tokyo (JP)

(72) Inventors: Yukie Takahashi, Kunitachi Tokyo (JP); Kei Imada, Hamura Tokyo (JP); Go Ito, Setagaya Tokyo (JP); Toshimitsu Kaneko, Kawasaki Kanagawa (JP); Kanako Saito, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/842,030

(22) Filed: Sep. 1, 2015

(65) Prior Publication Data
US 2016/0189346 A1 Jun. 30, 2016

Related U.S. Application Data

(60) Provisional application No. 62/097,399, filed on Dec. 29, 2014.

(51) Int. Cl.
| G06K 9/40 | (2006.01) |
| G06T 3/40 | (2006.01) |
| G06T 5/00 | (2006.01) |
| G06T 5/20 | (2006.01) |

(Continued)

(52) U.S. Cl.
CPC .............. *G06T 3/4053* (2013.01); *G06K 9/40* (2013.01); *G06T 5/002* (2013.01); *G06T 5/20* (2013.01); *G06T 7/0085* (2013.01); *H04N 5/23251* (2013.01); *G06T 2207/10024* (2013.01);

(Continued)

(58) Field of Classification Search
CPC ..... G06T 3/4053; G06T 3/4061; G06T 5/002; G06T 5/003; G06T 5/20; G06T 5/50; G06T 7/0085; G06T 2207/20182; G06T 2207/20192; G06T 2207/10024;

(Continued)

(56) References Cited

U.S. PATENT DOCUMENTS

| 8,805,120 B2* | 8/2014 | Min | G06T 3/4046 |
| | | | 382/224 |
| 8,934,720 B2* | 1/2015 | Hamada | G06T 3/4053 |
| | | | 348/607 |
| 9,105,086 B2* | 8/2015 | Salvador | G06T 5/003 |

(Continued)

FOREIGN PATENT DOCUMENTS

| JP | 2008-263465 A | 10/2005 |
| JP | 2012-103765 A | 5/2012 |

(Continued)

*Primary Examiner* — Jose Couso
(74) *Attorney, Agent, or Firm* — Knobbe, Martens, Olson & Bear, LLP

(57) ABSTRACT

According to one embodiment, an electronic device includes circuitry. The circuitry is configured to: receive first image data for displaying a first image that comprises a plurality of regions, modify a first region of the first image by adding at least a high-frequency component based on second image data, the first region of the first image including fewer noise components than a first threshold, and output third image data for displaying the first image that comprises the plurality of regions and the modified first region.

9 Claims, 17 Drawing Sheets

(51) Int. Cl.
*G06T 7/00* (2017.01)
*H04N 5/232* (2006.01)

(52) U.S. Cl.
CPC ............... *G06T 2207/20182* (2013.01); *G06T 2207/20192* (2013.01)

(58) Field of Classification Search
CPC .......... G06K 9/40; G06K 9/46; H04N 1/3871; H04N 1/409; H04N 5/21; H04N 5/23251; H04N 7/0117
See application file for complete search history.

(56) References Cited

U.S. PATENT DOCUMENTS

2013/0301933 A1   11/2013   Salvador et al.

FOREIGN PATENT DOCUMENTS

| | | |
|---|---|---|
| JP | 2013-235594 A | 11/2013 |
| JP | 2013-250891 A | 12/2013 |

\* cited by examiner

ELECTRONIC DEVICE, METHOD, AND COMPUTER PROGRAM PRODUCT

CROSS-REFERENCE TO RELATED APPLICATIONS

This application claims the benefit of U.S. Provisional Patent Application No. 62/097,399, filed Dec. 29, 2014, the entire contents of which are incorporated herein by reference.

FIELD

Embodiments described herein relate generally to an electronic device, a method, and a computer program product.

BACKGROUND

Conventional cameras and television receiver devices perform various types of image processing to improve resolution and image quality of image data. As a type of image processing, a technology of adding a high-frequency image component such as texture to image data is known.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to an embodiment, an electronic device comprises circuitry. The circuitry is configured to: receive first image data for displaying a first image that comprises a plurality of regions, modify a first region of the first image by adding at least a high-frequency component based on second image data, the first region of the first image including fewer noise components than a first threshold, and output third image data for displaying the first image that comprises the plurality of regions and the modified first region.

The embodiments below describe an example of applying the electronic device to a television display device.

Figure 1:
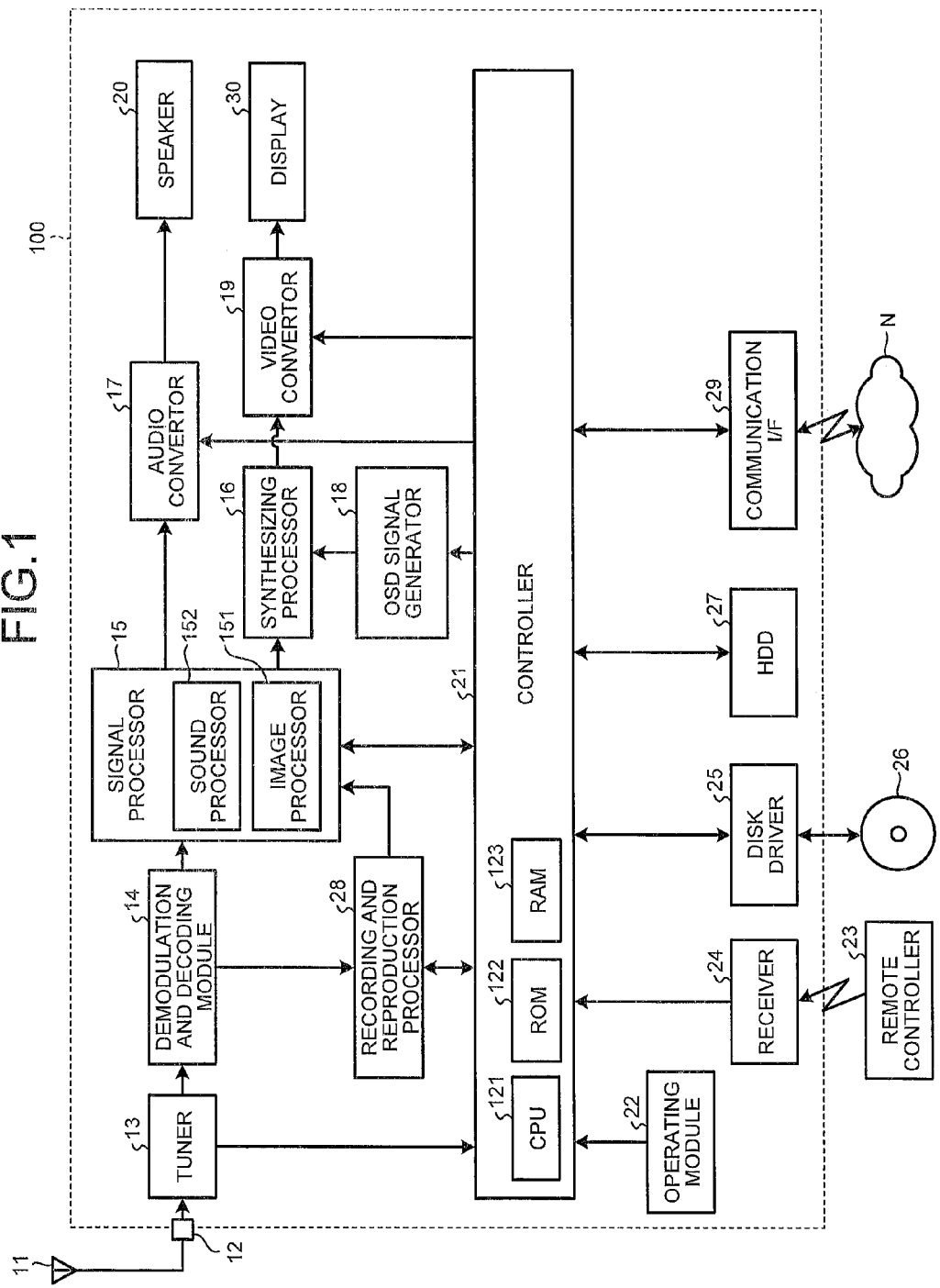
FIG. 1 is an exemplary diagram illustrating a configuration example of a television display device according to a first embodiment.

FIG. 1 is a diagram illustrating a configuration example of a television display device 100 according to a first embodiment. As illustrated in FIG. 1, the television display device 100 can select a broadcast signal of a desired channel by supplying broadcast signals received at an antenna 11 to a tuner 13 via an input terminal 12.

The television display device 100 supplies the broadcast signal selected by the tuner 13 to a demodulation and decoding module 14 to restore the broadcast signal to, for example, a digital video signal and a digital audio signal, and outputs the signals to a signal processor 15.

The signal processor 15 comprises an image processor 151 that performs certain image processing on the digital video signal supplied from the demodulation and decoding module 14, and a sound processor 152 that performs certain sound processing on the digital audio signal supplied from the demodulation and decoding module 14.

The image processor 151 is an electronic circuit that performs certain image processing for improving image quality on the digital video signal supplied from the demodulation and decoding module 14, and outputs the digital video signal having been subjected to the image processing to a synthesizing processor 16. The sound processor 152 is an electronic circuit that outputs the digital audio signal having been subjected to the sound processing to an audio converter 17. The detailed configuration of the image processor 151 will be described later.

The synthesizing processor 16 superimposes on-screen display (OSD) signals that are superimposition video signals such as subtitles, a graphical user interface (GUI), and OSDs generated at an OSD signal generator 18 on the digital video signal supplied from the signal processor 15 (image processor 151), and outputs the superimposed digital video signal.

The television display device 100 supplies the digital video signal output from the synthesizing processor 16 to a video convertor 19. The video convertor 19 converts the received digital video signal into an analog video signal in a format that is displayable on a display 30 at the subsequent stage. The television display device 100 supplies the analog video signal output from the video convertor 19 to the display 30 to display a video image. The display 30 comprises a display device such as a liquid crystal display (LCD), and displays the analog video signal output from the video convertor 19.

The audio convertor 17 converts the digital audio signal supplied from the signal processor 15 (sound processor 152) into an analog audio signal in a format that is reproducible by a speaker 20 at the subsequent stage. The audio convertor 17 outputs the analog audio signal to the speaker 20 to reproduce sound.

The television display device 100 controls, as a whole, the entire operations including the above-described reception operations by using a controller 21. The controller 21 comprises a central processing unit (CPU) 121, a read only memory (ROM) 122 that stores computer programs executed by the CPU 121, and a random access memory (RAM) 123 that provides the CPU 121 with a work area. The controller 21 controls, as a whole, operations of the respective modules by cooperation between the CPU 121 and various computer programs.

Specifically, the controller 21 receives operation information from an operating module 22 installed on the main body of the television display device 100, or receives operation information sent from a remote controller 23 and received at a receiver 24, and controls each module so that the operation information will be implemented.

The controller 21 may connect to a disk driver 25. The disk driver 25 is a device to which and from which an optical disc 26 such as a Blu-ray disc (BD) or a digital versatile disc (DVD) can be attached and detached, and the disk driver 25 has a function of recording and reproducing digital data on and from the attached optical disc 26.

In accordance with an operation by a viewer on the operating module 22 or the remote controller 23, the controller 21 can control a recording and reproduction processor 28 to encode the digital video signal and the digital audio signal acquired from the demodulation and decoding module 14 and convert the signals into signals in a certain recording format, and can supply the converted signals to the disk driver 25 to cause the disk driver 25 to record the signals on the optical disc 26.

The controller 21 connects to a hard disk drive (HDD) 27. The HDD 27 may be an external device. When the viewer designates a program to be recorded via the operating module 22 or the remote controller 23, the controller 21 causes the recording and reproduction processor 28 to encode the video signal and the audio signal (hereinafter referred to as program data) of this program acquired from the demodulation and decoding module 14 and to convert the program data into data in a certain recording format, and supplies the converted program data to the HDD 27 to cause the HDD 27 to record the program data. The program is recorded, accordingly.

In accordance with an operation by the viewer on the operating module 22 or the remote controller 23, the controller 21 controls the HDD 27 to read the program data of the recorded program or controls the disk driver 25 to read the digital video signal and the digital audio signal from the optical disc 26, and controls the recording and reproduction processor 28 to decode the program data or the digital signals and to supply the data or the signals to the signal processor 15 to display a video image and reproduce sound.

The controller 21 connects to a communication I/F 29. The communication I/F 29 is a communication interface that can connect to a network N such as the Internet. The controller 21 transmits and receives various kinds of information to and from an external device (not illustrated) connected to the network N via the communication I/F 29.

Figure 2:
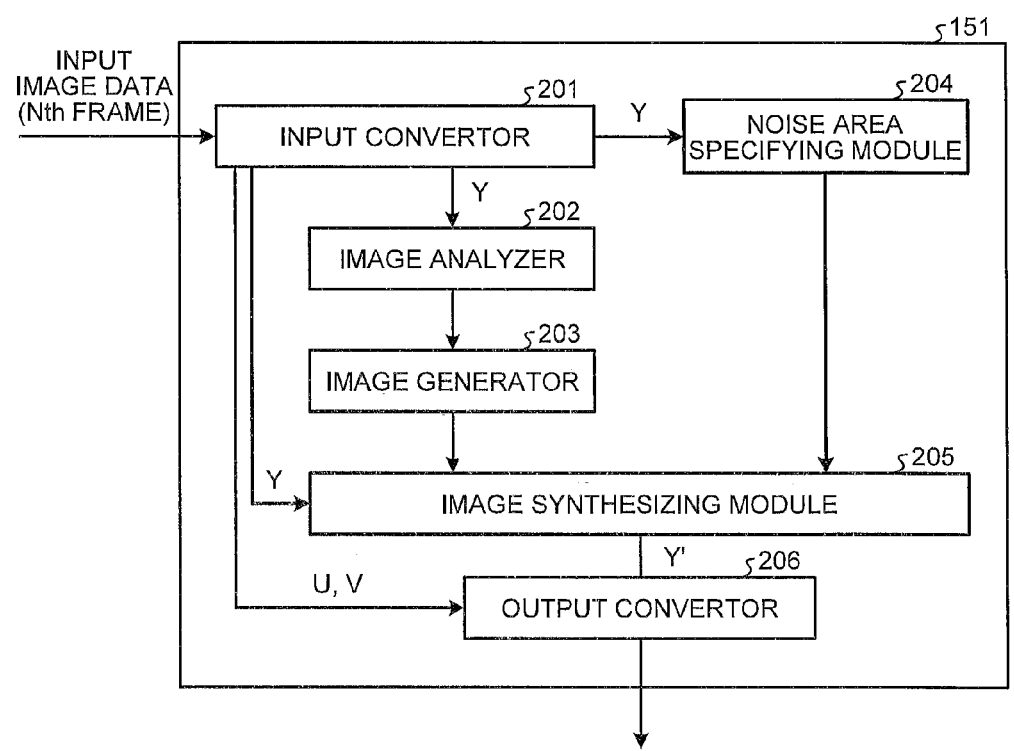
FIG. 2 is an exemplary diagram illustrating an example of functional configurations of an image processor according to the first embodiment.

Described next is functional configurations of the image processor 151 described above. FIG. 2 is a diagram illustrating an example of functional configurations of the image processor 151. As illustrated in FIG. 2, the image processor 151 comprises an input convertor 201, an image analyzer 202, an image generator 203, a noise area specifying module 204, an image synthesizing module 205, and an output convertor 206 as an electronic circuit that performs image processing on the digital video signal. The configurations of the image processor 151 may be configured by hardware or by software that is implemented by executing a computer program (not illustrated) by the processor. In the following description, a digital video signal per frame supplied from the demodulation and decoding module 14 is referred to as input image data. The image size of an input image may be any size in the first embodiment.

The input convertor 201 converts a format of input image data into an image format for image processing in the image processor 151. Although, in the first embodiment, the format of an input image is RGB format and the format for image processing is YUV format, the formats are not limited to this. In the first embodiment, image processing is performed by using brightness (Y) and color (UV) in the configuration to be described later.

The image analyzer 202 analyzes the input image data. The image analyzer 202 may analyze the input image data pixel by pixel or block by block. The image analyzer 202 analyzes the input image data by detecting, for example, edges on the basis of how much brightness (Y) varies and how much color (UV) varies.

The image generator 203 generates image data for adding a high-frequency component to a region of the input image data, the region containing fewer noise components, on the basis of the result of the analysis by the image analyzer 202. The image generator 203 may generate the image data containing a high-frequency component by using any method that is not limited to known methods.

The noise area specifying module 204 analyzes noise contained in regions in which the noise is displayed as the input image data. The noise area specifying module 204 according to the first embodiment specifies a region containing more noise components and a region containing fewer noise components than a threshold determined in advance. The threshold is determined in accordance with actual implementation of the embodiment. Although the noise area specifying module 204 analyzes noise in image data by using a general analysis processing method, it may use any analysis method. In the first embodiment, the input image data is data for displaying an image including a region containing more noise components and a region containing fewer noise components.

The image synthesizing module 205 synthesizes image data generated at the image generator 203 for adding a high-frequency component with the image data in the region containing fewer noise components specified at the noise area specifying module 204 out of the input image data (for example, Y of the input image data). In the first embodiment, the synthesizing processing provides modification for adding at least a high-frequency component to an image corresponding to a region of the input image data containing fewer noise components by using an image for adding a high-frequency component.

The output convertor 206 converts the synthesized image data (Y' output from the image synthesizing module 205, and U and V output from the input convertor 201) into image data in an output image format. Although, in the first embodiment, the output convertor 206 converts the synthesized image data in YUV format into image data in RGB format, the formats are not limited to this.

Figure 3:
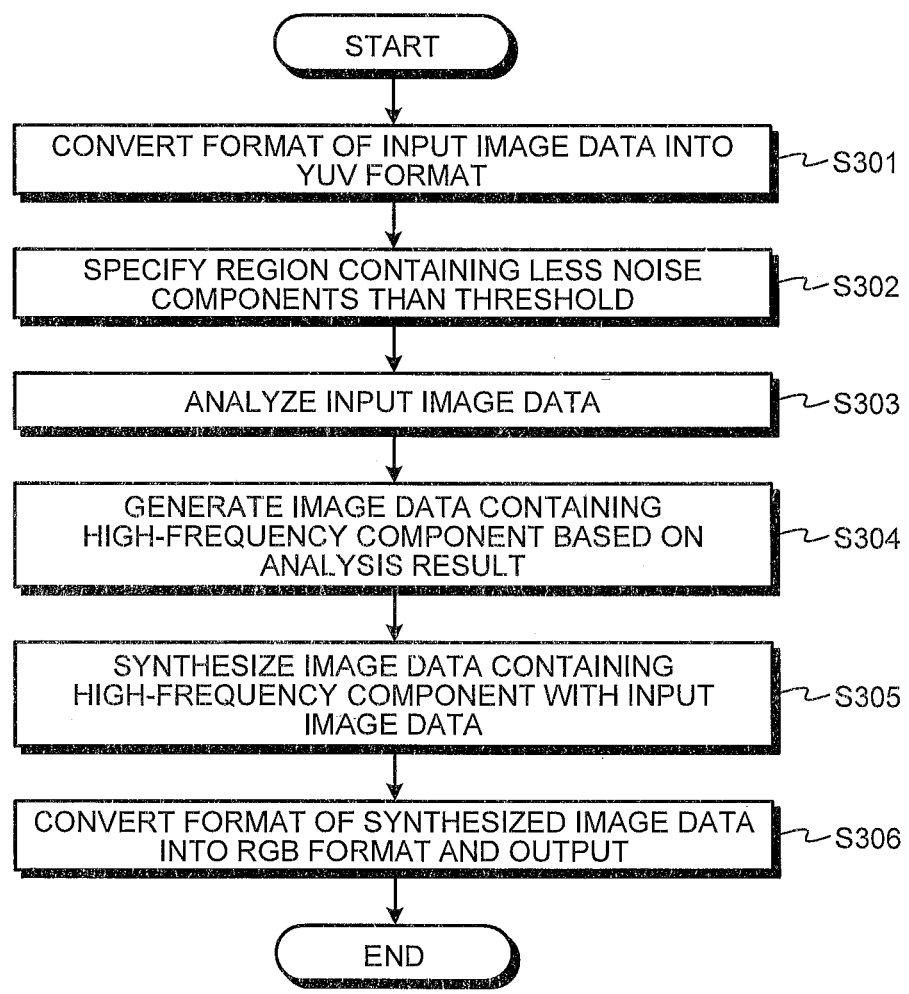
FIG. 3 is an exemplary flowchart illustrating the procedure of image processing in the image processor according to the first embodiment.

Described next is image processing in the image processor 151 according to the first embodiment. FIG. 3 is a flowchart illustrating the procedure of the above-described processing in the image processor 151 according to the first embodiment.

The input convertor 201 converts a format of input image data into YUV format (S301).

The noise area specifying module 204 analyzes noise contained in the regions of the input image data and specifies a region containing noise components at least fewer than a threshold determined in advance (S302).

The image analyzer 202 analyzes the input image data (S303).

The image generator 203 generates image data containing a high-frequency component on the basis of the result of the analysis by the image analyzer 202 (S304).

The image synthesizing module 205 synthesizes the image data containing a high-frequency component with the input image data (S305).

The output convertor 206 converts the format of the synthesized image data into RGB format, and outputs the image data (S306).

In the first embodiment, adding a high-frequency component only to a region containing fewer noise components can prevent emphasis of noise.

The first embodiment describes an example of not changing the display size of an input image. When, however, the resolution of the television display device is higher than that for the display size of the input image data, magnifying the input image data simply in accordance with the resolution of the television display device may cause a sense of something unnatural in the displayed image data. A second embodiment of the present invention describes processing performed when the input image data is magnified in accordance with the resolution of the television display device.

Figure 4:
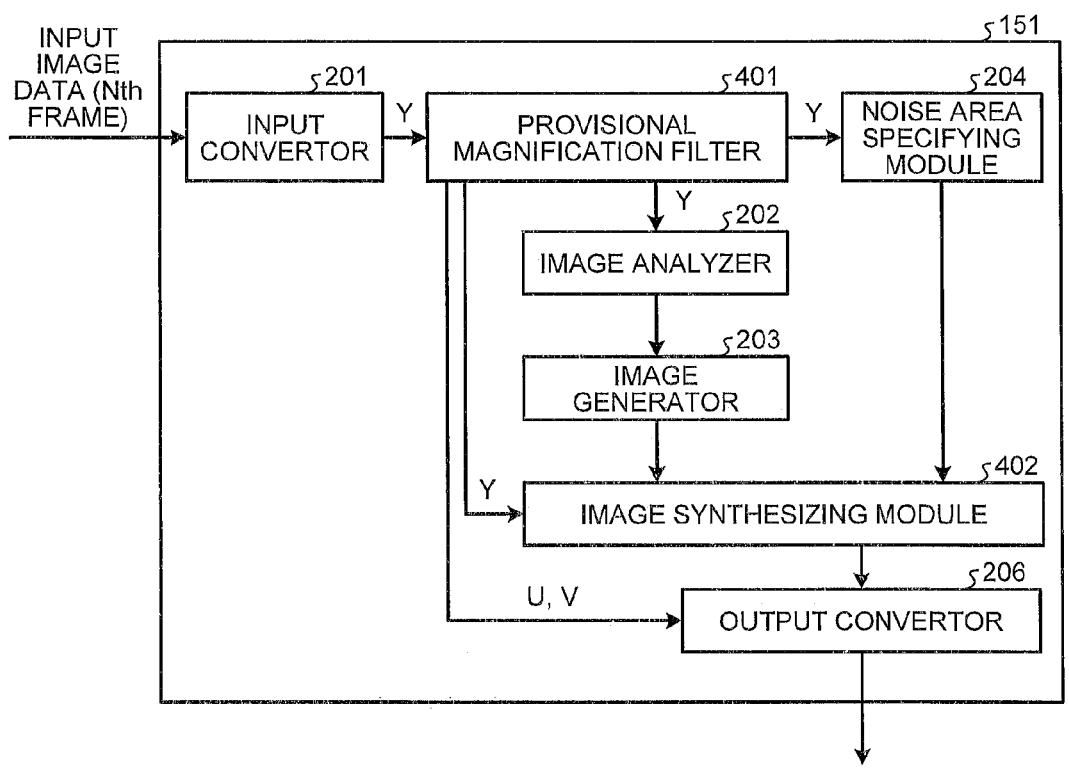
FIG. 4 is an exemplary diagram illustrating an example of functional configurations of an image processor according to a second embodiment.

FIG. 4 is a diagram illustrating an example of functional configurations of an image processor 151 according to the second embodiment. As illustrated in FIG. 4, the image processor 151 comprises the input convertor 201, a provisional magnification filter 401, the image analyzer 202, the image generator 203, the noise area specifying module 204, an image synthesizing module 402, and the output convertor 206 as an electronic circuit that performs image processing on the digital video signal. The configurations of the image processor 151 may be configured by hardware or by software that is implemented by executing a computer-program (not illustrated) by the processor. Although, in the second embodiment, the display size of input image data is 1920× 1080 and the resolution of the display 30 to which image data is output is 3840×2160, the display size and the resolution are not limited to these. The resolution of the device to which image data is output only needs to be larger than the display size of the input image data. The same reference signs are given to the same configurations as those in the first embodiment, and the description thereof is omitted.

The provisional magnification filter 401 is a filter that magnifies the input image data received from the input convertor 201. The provisional magnification filter 401 may use any filter such as a cubic convolution filter as the magnification filter.

The image generator 203 generates image data containing a high-frequency component on the basis of the result of the analysis by the image analyzer 202. The image generator 203 according to the second embodiment generates image data containing a high-frequency component having a display size of 3840×2160, which is equal to the resolution of the display 30, or larger.

The image synthesizing module 402 synthesizes image data containing a high-frequency component and generated at the image generator 203 with the image data in the region containing fewer noise components specified at the noise area specifying module 204 out of the input, image data (for example, Y of the input image data) magnified at the provisional magnification filter 401.

In the second embodiment, with the configuration described above, the display 30 displays magnified image data of the input image data. In the second embodiment, synthesizing image data containing a high-frequency component that fits the resolution of 3840×2160 of the display 30 with the input image data allows the display 30 to display texture suitable for the resolution of 3840×2160 of the display 30.

Figure 5:
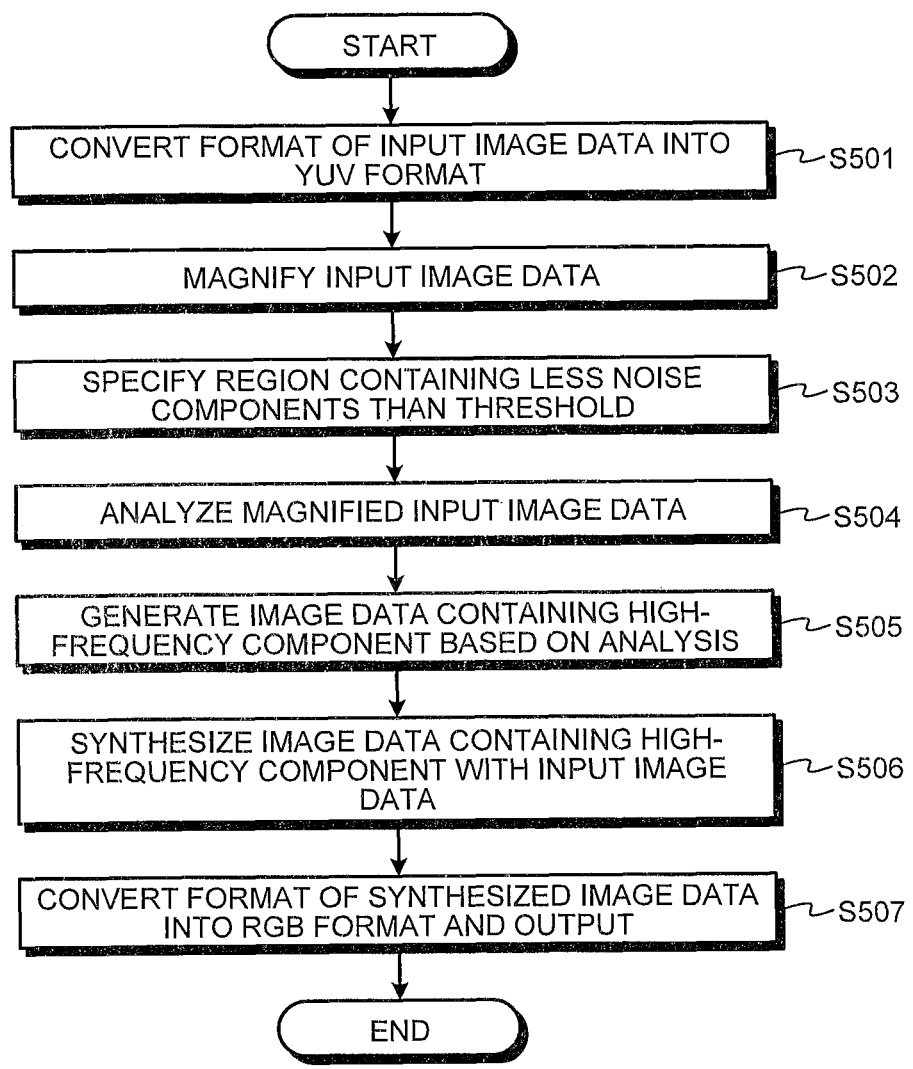
FIG. 5 is an exemplary flowchart illustrating the procedure of image processing in the image processor according to the second embodiment.

Described next is image processing in the image processor 151 according to the second embodiment. FIG. 5 is a flowchart illustrating the procedure of the above-described processing in the image processor 151 according to the second embodiment.

The input convertor 201 converts a format of input image data into YUV format (S501).

The provisional magnification filter 401 magnifies the input image data (S502).

The noise area specifying module 204 analyzes noise contained in the regions of the magnified input image data, and specifies a region containing noise components at least fewer than a threshold determined in advance (S503).

The image analyzer 202 analyzes the magnified input image data (S504).

The image generator 203 generates image data containing a high-frequency component on the basis of the result of the analysis by the image analyzer 202 (S505).

The image synthesizing module 402 synthesizes the image data containing a high-frequency component with the magnified input image data (S506). Alternatively, noise reduction processing may be provided on the region containing more noise components than a threshold determined in advance, and the processing at S504 to S506 may be performed on the input image data having been subjected to the noise reduction processing.

The output convertor 206 converts the format of the synthesized image data into RGB format, and outputs the image data (S507).

In the second embodiment, adding a high-frequency component to a region containing fewer noise components in image data magnified in accordance with the resolution of the television display device can improve texture and can prevent emphasis of noise in a region containing more noise components.

The first and the second embodiments describe a module that generates a high-frequency component on the basis of a result of edge analysis. A third embodiment more specifically describes an example of generating a high-frequency component.

Figure 6:
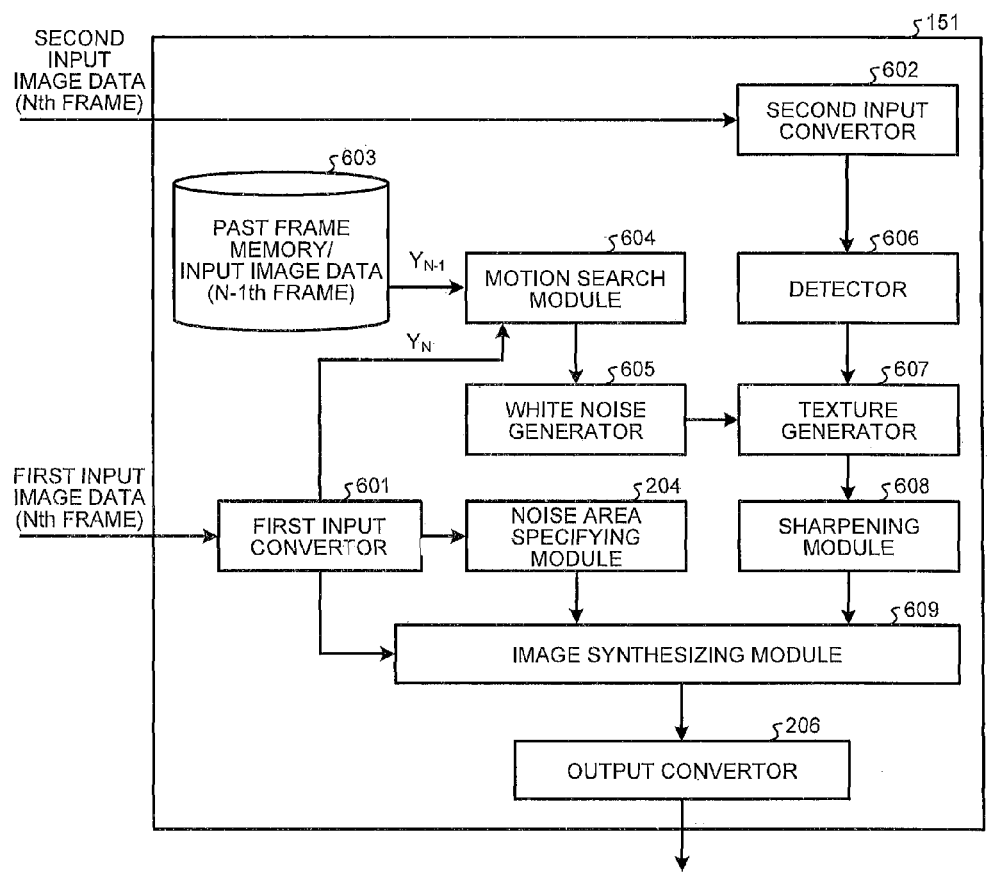
FIG. 6 is an exemplary diagram illustrating an example of functional configurations of an image processor according to a third embodiment.

FIG. 6 is a diagram illustrating an example of functional configurations of an image processor 151 according to the third embodiment. As illustrated in FIG. 6, the image processor 151 comprises a first input convertor 601, a second input convertor 602, a past frame memory 603, a motion search module 604, a white noise generator 605, a detector 606, a texture generator 607, a sharpening module 608, an image synthesizing module 609, the noise area specifying module 204, and the output convertor 206 as an electronic circuit that performs image processing on the digital video signal. The same reference signs are given to the same configurations as those in the first and the second embodiments, and the description thereof is omitted.

Although, in the third embodiment, the display size of the first input image data is 3840×2160, the display size of the second input image data is 1920×1080, and the resolution of the display 30 on which image data is displayed is 3840×2160, the display sizes and the resolution are not limited to these. The first input image data and the second input image data have the same image and are different only in display size. The first input image data may be, for example, higher in resolution than the second input image data, obtained by, for example, the super-resolution technique. For another example, the first input image data may be image data received by the tuner 13, and the second input image data may be image data received by the communication I/F 29.

In the third embodiment, using the second input image data having a smaller display size than that of the first input image data reduces processing load.

In the third embodiment, image data having the same display size as that of the input high-resolution first image data is output on the basis of the input (low-resolution) second image data and the (high-resolution) first image data. The processing is performed using brightness (Y) and color (UV).

The first input convertor 601 converts the format of the first input image data (display size: 3840×2160) received from the tuner 13 into an image format in YUV format for the image processing in the image processor 151.

The second input convertor 602 converts the format of the second input image data (display size: 1920×1080) received from the communication I/F 29 into an image format in YUV format for the image processing in the image processor 151.

The past frame memory 603 stores therein a plurality of past frames, in time order from a newer frame to older one, of the first input image data (display size: 3840×2160) converted at the first input convertor 601. When, for example, the first input convertor 601 converts the Nth frame of the first input image data, the past frame memory 603 outputs at least the N−1th frame of the first input image data to the motion search module 604.

The motion search module 604 searches motion between the first input image data and past first input image data stored in the past frame memory 603, and obtains the amount of motion from the search result.

The white noise generator 605 generates white noise containing noise components sorted in accordance with the amount of motion obtained in the motion search module 604. At least a part of the noise components has randomness. In other words, the white noise follows the motion of an object displayed in the first input image data.

The detector 606 analyzes the (low-resolution) second input image data, detects edges included in the second input image data, and generates edge analysis information. The detector 606 may analyze edges either pixel by pixel or block by block. The edge analysis information according to the third embodiment contains at least a result of histogram analysis on edge orientations. The result of the analysis may include, for example, edge gradients and a degree of preservation of edge orientations. The edge gradients and the degree of preservation of edge orientations are used to obtain an orientation of texture and skewness of gradient distribution to be described later.

The texture generator 607 shapes the white noise generated at the white noise generator 605 on the basis of the edge analysis information, and generates image data that represents a texture component that is a high-frequency component. As described above, the image data that represents a texture component according to the third embodiment is generated by using noise components at least partly including randomness and an edge component contained in a region in the input image containing fewer noise components. The third embodiment uses filter processing, for example, anisotropic Gaussian filtering in consideration of orientations of edges and texture to shape the white noise.

The texture generator 607 according to the third embodiment computes a texture orientation θ and skewness of gradient distribution of the input image data on the basis of the edge analysis information, and generates GaussianFilter in accordance with the texture orientation θ and the skewness of the gradient distribution. The texture generator 607 controls the orientation of the white noise generated at the white noise generator 605 by applying the GaussianFilter, and generates a texture component.

Described next is how the texture generator 607 computes the texture orientation θ. In the third embodiment, a gradient histogram is generated from a result of analysis of edge components of the input image data using RobertsFilter based on the edge analysis information of the input image data. In the third embodiment, a gradient with the maximum frequency is obtained from the gradient histogram, and the texture orientation θ in a local region is computed from the average of neighboring gradients of the gradient with the maximum frequency and the average of their frequencies. A method for analyzing edge components is not limited to RobertsFilter; other methods may be used.

Figure 7:
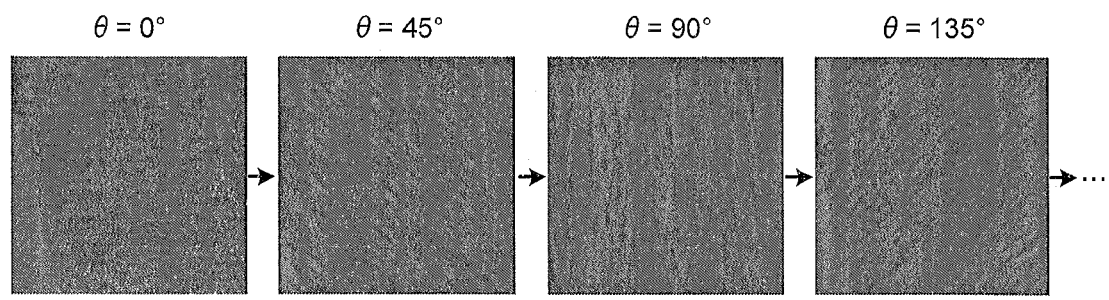
FIG. 7 is an exemplary diagram illustrating an example of a texture orientation θ according to the third embodiment.

FIG. 7 is a diagram illustrating an example of the texture orientation θ. As illustrated in FIG. 7, as the texture orientation θ changes from 0°, 45°, 90°, to 135°, the texture component also changes.

Described next is how the texture generator 607 computes the skewness of gradient distribution. The skewness of gradient distribution is computed by using the gradient histogram. The maximum frequency of the gradient histogram is determined as the length of the GaussianFilter in the major axis direction, and the frequency of a gradient shifted by 90° from the gradient with the maximum frequency is determined as the length of the GaussianFilter in the vertical direction perpendicular to the major axis.

Figure 8:
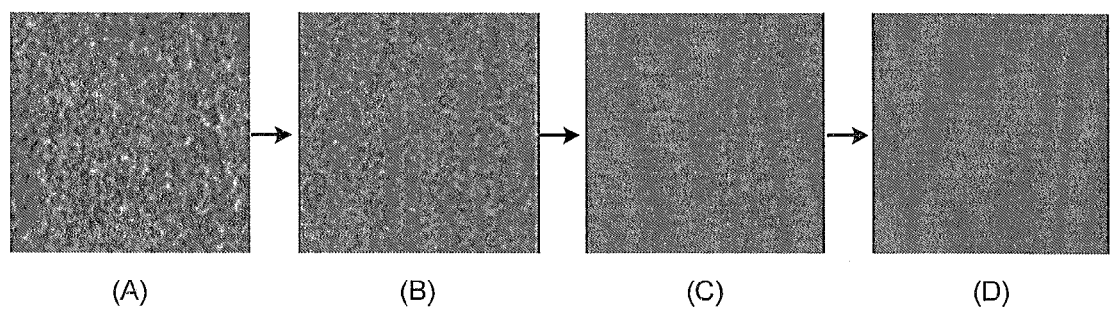
FIG. 8 is an exemplary diagram illustrating an example of skewness of gradient distribution.

FIG. 8 is a diagram illustrating an example of the skewness of gradient distribution. As illustrated in FIG. 8, as the skewness of gradient distribution increases, the texture component changes from (A), (B), (C), to (D).

The sharpening module 608 performs sharpening processing to sharpen the texture component generated by the texture generator 607. For example, filter processing such as unsharp masking is performed.

The image synthesizing module 609 synthesizes image data containing the texture components generated at the texture generator 607 and the sharpening module 608, in other words, a high-frequency component with the input image data in the region containing fewer noise components specified by the noise area specifying module 204 out of the input image data (for example, Y of the input image data). In the third embodiment, intensity in the synthesizing processing may be adjusted on the basis of the amount of noise in each region analyzed at the noise area specifying module 204.

Figure 9:
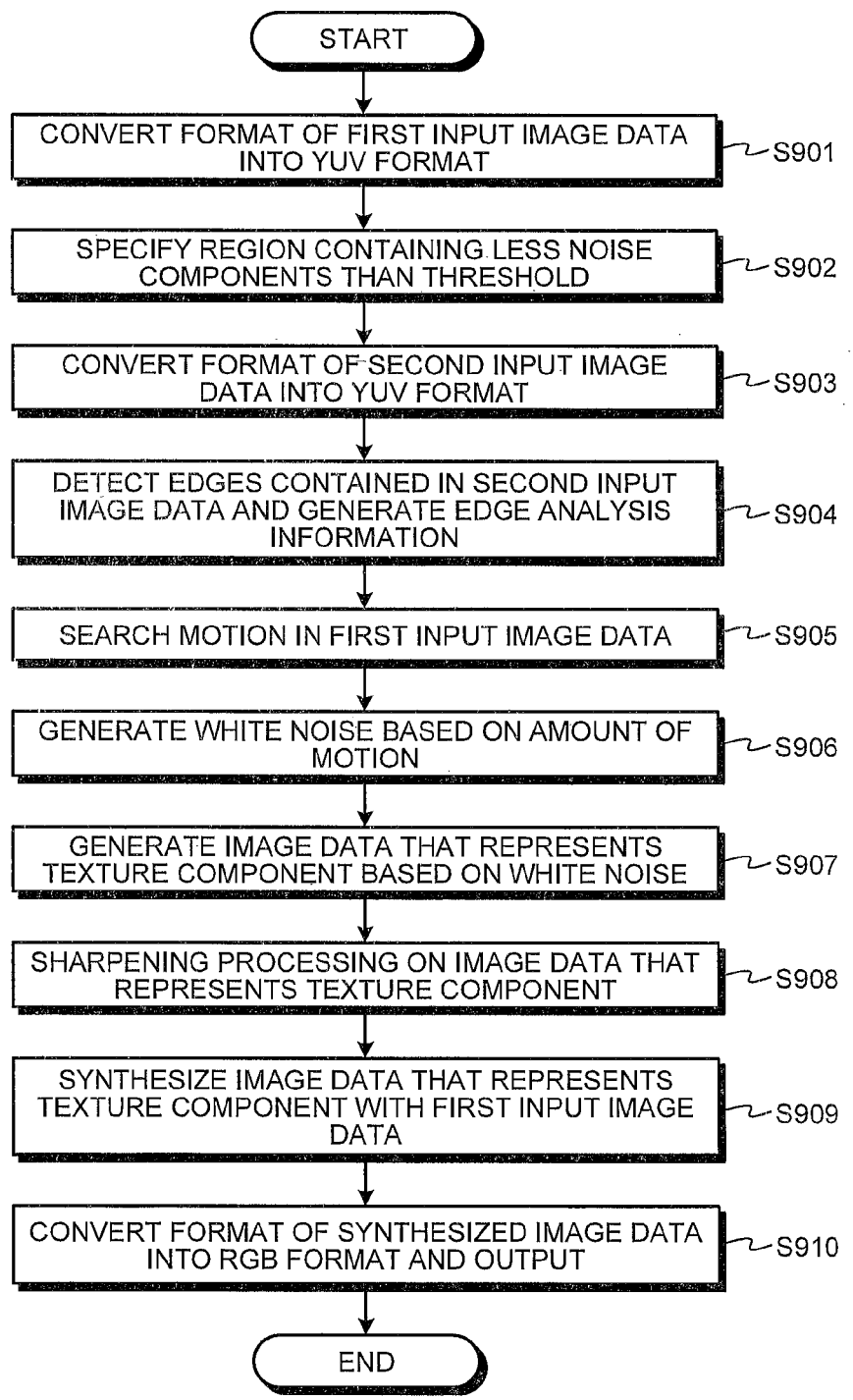
FIG. 9 is an exemplary flowchart illustrating the procedure of image processing in the image processor according to the third embodiment.

Described next is the image processing in the image processor 151 according to the third embodiment. FIG. 9 is a flowchart illustrating the procedure of the above-described processing in the image processor 151 according to the third embodiment.

The first input convertor 601 converts a format of the first input image data into YUV format (S901).

The noise area specifying module 204 analyzes noise contained in the regions of magnified input image data, and specifies a region containing noise components at least fewer than a threshold determined in advance (S902).

The second input convertor 602 converts a format of the second input image data into YUV format (S903).

The detector 606 detects edges included in the (low-resolution) second input image data, and generates edge analysis information (S904).

The motion search module 604 searches motion between the first input image data and past first input image data, and obtains the amount of motion from the search result (S905).

The white noise generator 605 generates white noise containing noise components sorted in accordance with the amount of motion (S906). For example, the white noise generator 605 may use a random number generator such as the Box-Muller transform to generate, in advance, random numbers for the display size that is the same as that of the first input image data, determine the random numbers as noise components having randomness, and sort the noise components in accordance with the amount of motion. A method for generating noise is not limited to the Box-Muller transform to generate noise; other methods may be used.

The texture generator 607 shapes the white noise on the basis of the edge analysis information, and generates image data that represents a texture component that is a high-frequency component (S907).

The sharpening module 608 performs sharpening processing on the image data that represents the texture component (S908).

The image synthesizing module 609 synthesizes the image data that represents the texture component with the first input image data (S909).

The output convertor 206 converts the format of the synthesized image data into RGB format and outputs the converted image data (S910).

When noise components are sorted as has been performed in conventional technologies, texture components are not generated in accordance with the pattern of original input image data, by noise component, resulting in image data that looks as if it were covered with powders.

According to the third embodiment, in addition to the effects of the first and the second embodiments, a texture component generated from shaped noise is synthesized with the input image data on the basis of features of the input image data, thereby displaying a realistic image in minute detail.

The input image data also contains a region that has lost texture in encoding or image-capturing. A fourth embodiment describes an example of adding a texture component to a plain region that seems to have lost texture.

Figure 10:
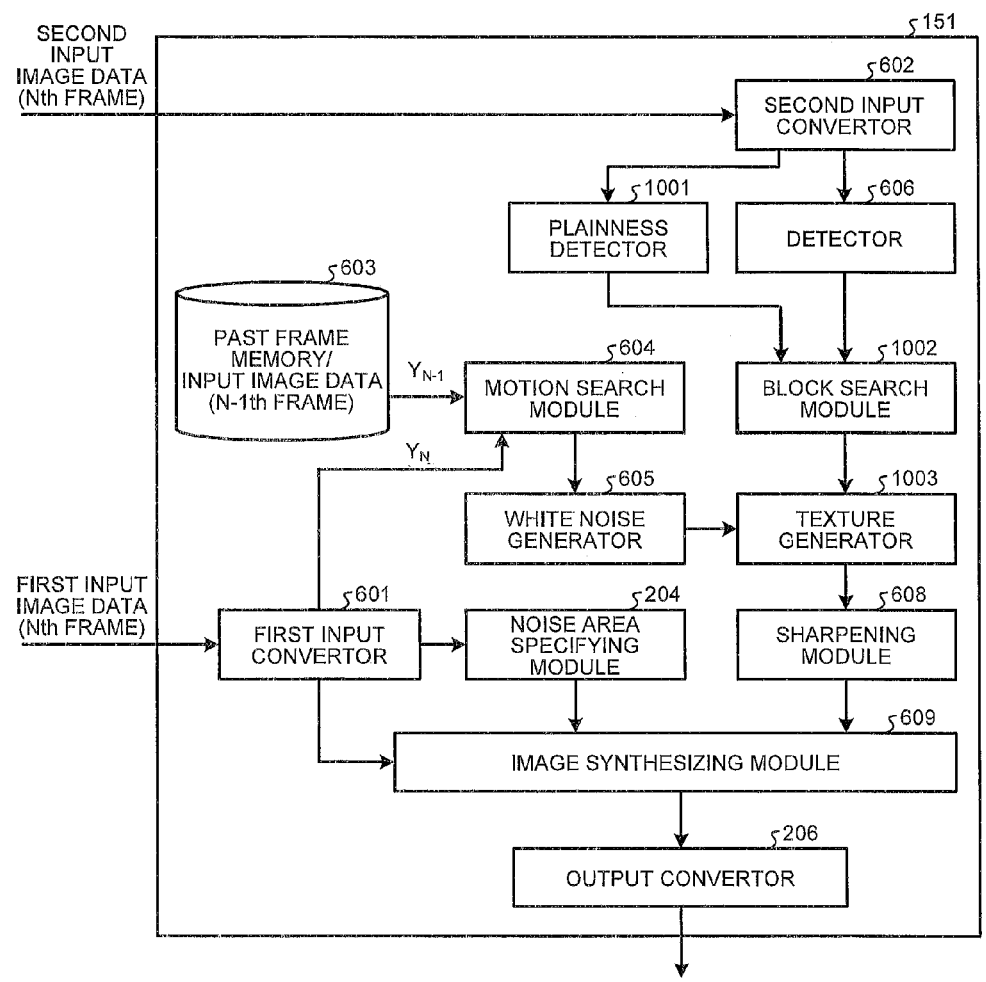
FIG. 10 is an exemplary diagram illustrating an example of functional configurations of an image processor according to a fourth embodiment.

FIG. 10 is a diagram illustrating an example of functional configurations of an image processor 151 according to the fourth embodiment. As illustrated in FIG. 10, the image processor 151 comprises the first input convertor 601, the second input convertor 602, the past frame memory 603, the motion search module 604, the white noise generator 605, the detector 606, a plainness detector 1001, a block search module 1002, a texture generator 1003, the sharpening module 608, the noise area specifying module 204, the image synthesizing module 609, and the output convertor 206 as an electronic circuit that performs image processing on the digital video signal. The same reference signs are given to the same configurations as those in the first to the third embodiments, and the description thereof is omitted.

The plainness detector 1001 detects a region having a certain size of the regions included in the (low-resolution) second input image data as a plain region when the brightness variation in the region is smaller than a certain threshold. The certain threshold is a threshold that can be estimated as a region from which texture of the input image data has been lost, and the value of the threshold is determined in accordance with an aspect of the embodiment.

The block search module 1002 searches a reference block near the plain region. The reference block is used to add a texture component to the plain region detected from the (low-resolution) second input image data.

The block search module 1002 according to the fourth embodiment specifies a reference block from blocks (for example, 16×16) located, for example, to the left, right, top, and bottom of a processing block included in the detected plain region. The reference block is used to add a texture component to the processing block. In other words, it is difficult to generate a texture component for a plain region by using the same method as used in the third embodiment. In the fourth embodiment, a texture component is generated for a plain region on the basis of the edge analysis information of a reference block near the plain region. Although the fourth embodiment describes an example of performing the block search processing on blocks, the block search processing may be performed on pixels.

The block search module 1002 according to the fourth embodiment computes a sum of absolute difference (SAD) between the processing block and a block adjacent to the processing block with respect to brightness and color. The block search module 1002 selects a reference block from the adjacent blocks by a determination method using thresholds on color SAD and brightness SAD. When, for example, the block search module 1002 selects a block having a small color SAD, information can be easily obtained from the same object, and when it selects a block having a large brightness SAD, the texture component can be emphasized. The edge analysis information of the selected reference block is used as the edge analysis information for the processing block.

The fourth embodiment can use a region generated on the basis of an edge component contained in another region near a plain region as a region of image data that represents a texture component and that is included in the first input image data and is synthesized with the plain region containing a brightness variation smaller than a second threshold.

The reference block is not limited to a block adjacent to the processing block. For example, the block search module 1002 may specify reduced image data of the second input image data as a reference block for adding a texture component to the plain region. Moreover, when the second input image data is input at first time, the block search module 1002 may specify a block included in a region of an image of the second input image data input at past time near the first time as a reference block.

Figure 11:
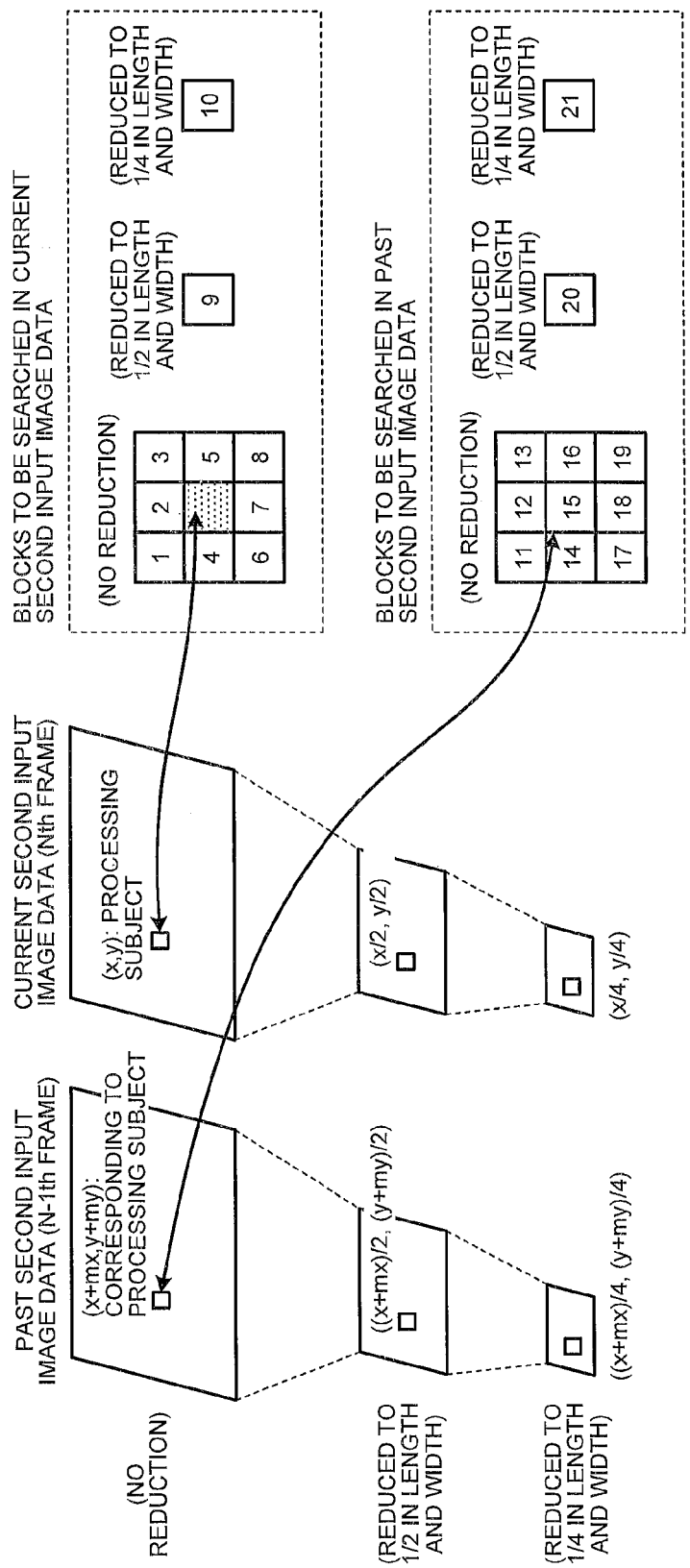
FIG. 11 is an exemplary diagram illustrating an example of relation between a processing block and a reference block according to the fourth embodiment.

FIG. 11 is a diagram illustrating an example of relation between a processing block and a reference block according to the fourth embodiment. In the example of FIG. 11, block search for a processing block (for example, 16×16) is described. When, for example, the processing subject is a pixel having coordinates (x, y), the processing block (for example, 16×16) may be set such that the pixel is the center of the processing block.

The reference block for adding texture to the processing block is selected from a total of 21 blocks including 8 adjacent blocks located to the left, right, top, and bottom of the processing block, 2 blocks (the center coordinates of the respective blocks: (x/2, y/2) and (x/4, y/4)) corresponding to the processing block in reduced image data of the processing block reduced to ½ and ¼ in length and width, and 11 blocks located in positions that are estimated, in consideration of the amount of motion, to correspond to the processing data in three types of image data of past second input image data (second input image data that is not reduced, second input image data reduced to ½, and second input image data reduced to ¼).

In FIG. 11, mx represents the amount of motion in the X direction, and my represents the amount of motion in the Y direction. In the past second input image data (input at time near the first time at which the second input image data is input), coordinates of the center pixel of a block corresponding to the processing block in the current input image data are (x+mx, y+my). In the past second input image data reduced to ½, and the past second input image data reduced to ¼, coordinates of the center pixels of the blocks corresponding to the processing block are ((x+mx)/2, (y+my)/2), and ((x+mx)/4, (y+my)/4), respectively. The block search module 1002 selects a reference block for the processing block from the 21 blocks.

Although, in the fourth embodiment, a reference block is selected from blocks included in past second input image data and current second input image data, a reference block to be selected is not limited to these blocks. For example, the block search module 1002 may select a reference block from blocks included in future second input image data.

In the fourth embodiment, color information is used to search a reference block included in the same object as the processing block in the second input image. In the fourth embodiment, however, a method for searching a reference block is not limited to color information; other technologies such as object recognition may be used to detect a boundary of an object and specify a reference block in the same object.

The texture generator 1003 shapes white noise generated at the white noise generator 605 on the basis of the edge analysis information obtained at the detector 606 and the block search module 1002, and generates image data that represents a texture component that is a high-frequency component. The texture generator 1003 according to the fourth embodiment shapes the white noise by using the edge analysis information of the reference block specified with respect to the processing block in a plain region, and generates a texture component for the processing block.

In the fourth embodiment, with the configuration described above, image data used for adding at least a high-frequency component to an image corresponding to a region containing fewer noise components of an input image at a certain time of the input image data is generated by using (1) noise components at least partly including randomness, and (2) an edge component contained in another region near the region containing fewer noise components of the input image at the certain time or time near the certain time of the input image data.

Figure 12:
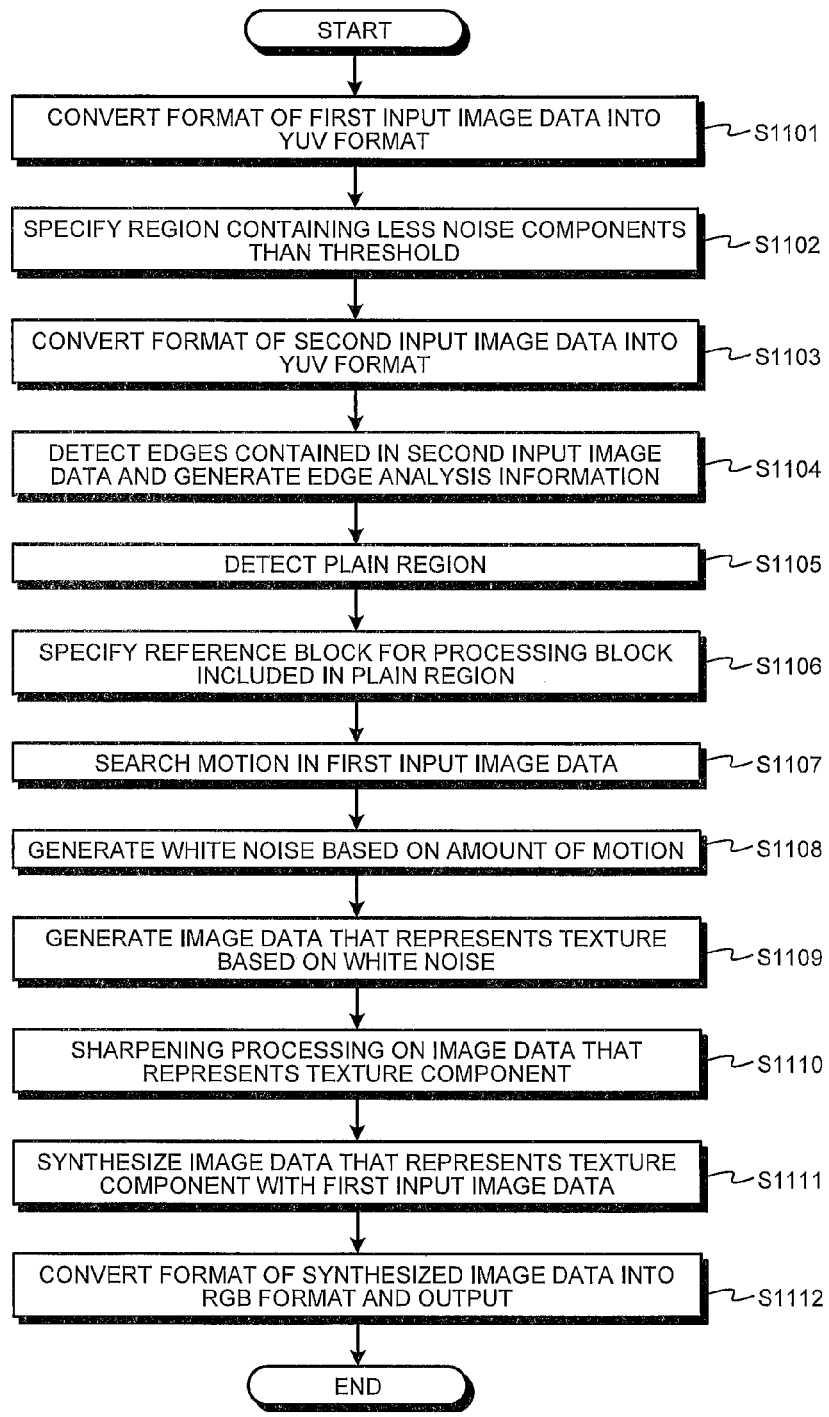
FIG. 12 is an exemplary flowchart illustrating the procedure of image processing in the image processor according to the fourth embodiment.

Described next is the image processing in the image processor 151 according to the fourth embodiment. FIG. 12 is a flowchart illustrating the procedure of the above-described processing in the image processor 151 according to the fourth embodiment.

The first input convertor 601 converts a format of the first input image data into YUV format (S1101).

The noise area specifying module 204 analyzes noise contained in the regions of magnified input image data, and specifies a region at least containing fewer noise components than a threshold determined in advance (S1102).

The second input convertor 602 converts a format of the second input image data to YUV format (S1103).

The detector 606 detects edges contained in the (low-resolution) second input image data, and generates edge analysis information (S1104).

The plainness detector 1001 detects a plain region from the regions included in the (low-resolution) second input image data (S1105).

The block search module 1002 specifies a reference block for the plain region detected from the (low-resolution) second input image data (S1106).

The motion search module 604 searches motion between the first input image data and past first input image data, and obtains the amount of motion from the search result (S1107).

The white noise generator 605 generates white noise containing noise components sorted in accordance with the amount of motion (S1108).

The texture generator 1003 shapes the white noise on the basis of the edge analysis information obtained at the detector 606 and the block search module 1002, and generates image data that represents a texture component that is a high-frequency component (S1109). The texture component for a processing block in the plain region is generated by using the edge analysis information of the reference block.

At S1110 to S1112, the image processor 151 performs the processing performed at S908 to S910 illustrated in FIG. 9, and outputs image data whose format is converted into RGB format.

In the fourth embodiment, in addition to the effects described in the first to the third embodiments, the image processor 151 can add a texture component to a region in input image data that has lost texture in encoding or image-capturing by referring to a nearby region that still keeps the texture component. With this configuration, the image processor 151 can reproduce high precision texture for a plain region.

In the fourth embodiment, adding a texture component to a plain region in accordance with the pattern in the same object can improve texture.

In the fourth embodiment, texture is added to a plain region by referring to a nearby region. However, by the method of the fourth embodiment, it is difficult to add texture to a wide plain region by referring to a nearby region. A fifth embodiment describes an example of adding texture to a plain region recursively so that the image processor 151 can add texture to a wide plain region.

Figure 13:
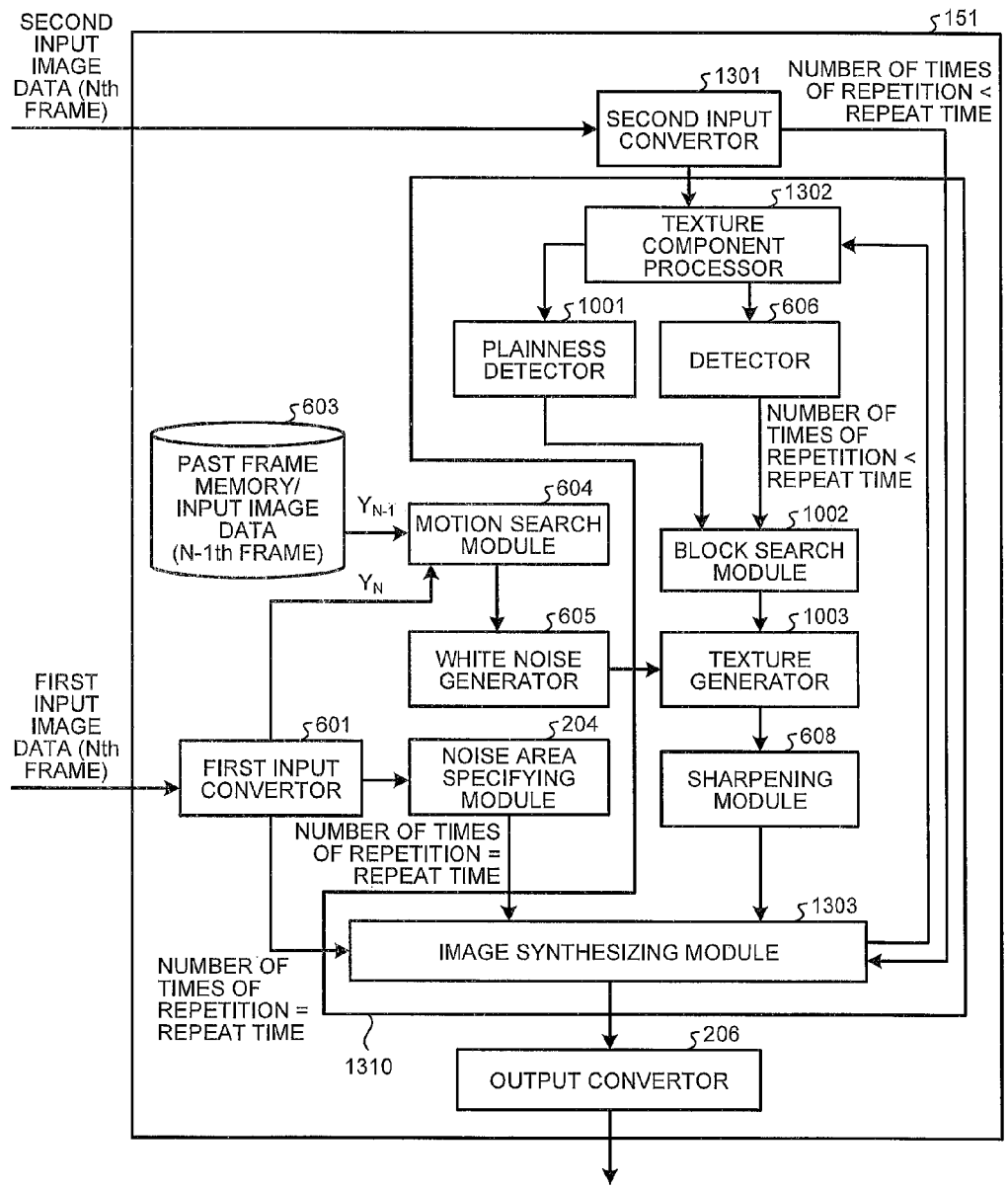
FIG. 13 is an exemplary diagram illustrating an example of functional configurations of an image processor according to a fifth embodiment.

FIG. 13 is a diagram illustrating an example of functional configurations of an image processor 151 according to the fifth embodiment. As illustrated in FIG. 13, the image processor 151 comprises the first input convertor 601, a second input convertor 1301, the past frame memory 603; the motion search module 604, the white noise generator 605, a texture component processor 1302, the detector 606, the plainness detector 1001, the block search module 1002, the texture generator 1003, the sharpening module 608, the noise area specifying module 204, an image synthesizing module 1303, and the output convertor 206 as an electronic circuit that performs image processing on the digital video signal. The same reference signs are given to the same configurations as those in the first to the fourth embodiments, and the description thereof is omitted.

In the fifth embodiment, using the configurations included in a module group 1310, repeat processing is performed recursively.

The second input convertor 1301 converts a format of the second input image data (display size: 1920×1080) into an image format in YUV format for the image processing in the image processor 151. The second input convertor 1301 outputs the second input image data to the texture component processor 1302, and the second input convertor 1301 outputs the second input image data to the image synthesizing module 1303 each time the repeat processing is performed (when the number of times of repetition is smaller than a parameter "Repeat Time" determined in advance).

The texture component processor 1302 separates the (low-resolution) second input image data into a skeleton component and a texture component. The texture component processor 1302 may separate the second input image data by using, for example, total variation filter and Retinex filter. The texture component processor 1302 adds the separated texture component to the second input image data before separation. The texture component processor 1302 may use image data reduced to a certain size in the processing.

After the same processing as performed in the fourth embodiment is performed, the image synthesizing module 1303 synthesizes image data containing a texture component received from the sharpening module 608 with the second input image data received from the second input convertor 1301. After synthesizing the image data with the second input image data, the image synthesizing module 1303 outputs the synthesized image data to the texture component processor 1302 in accordance with the number of times of repetition (when the number of times of repetition is smaller than the parameter "Repeat Time" determined in advance).

The texture component processor 1302 separates the image data received from the image synthesizing module 1303 into a skeleton component and a texture component, and adds the separated texture component to the image data before separation in accordance with the number of times of repetition (when the number of times of repetition is smaller than the parameter "Repeat Time" determined in advance). After the processing described above, the image synthesizing module 1303 synthesizes image data containing a texture component generated from the image data with the second input image data. The image synthesizing module 1303 repeats this processing for the number of times of the parameter "Repeat Time" determined in advance. In the fifth embodiment, the image processing unit 151 repeats edge component generation processing and texture component synthesizing processing for a plurality of times.

Figure 14:
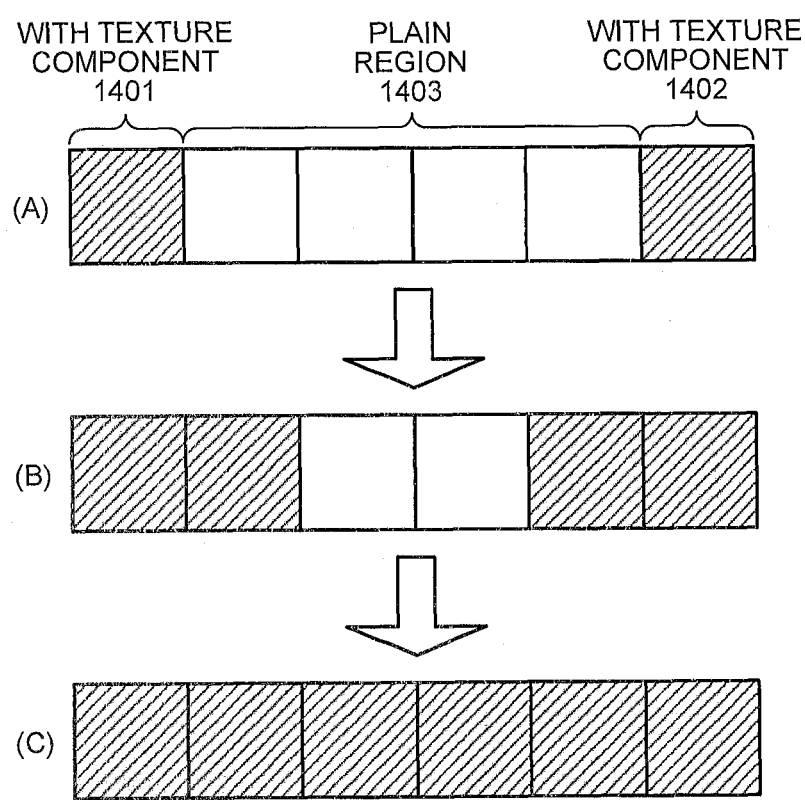
FIG. 14 is an exemplary diagram illustrating an example of a texture component that spreads every time the image processor repeats control according to the fifth embodiment.

FIG. 14 is a diagram illustrating an example of a texture component that spreads each time the above-described control is repeated. In a case of (A) in FIG. 14, even when reference blocks 1401 and 1402 are selected that contain a texture component, it is difficult to add the texture component to a plain region 1403 composed of a plurality of blocks. However, as illustrated in (B) and (C) in FIG. 14, repeating processing of selecting reference blocks and processing of adding the texture component recursively can add the texture component to the entire plain region in the same object.

Figure 15:
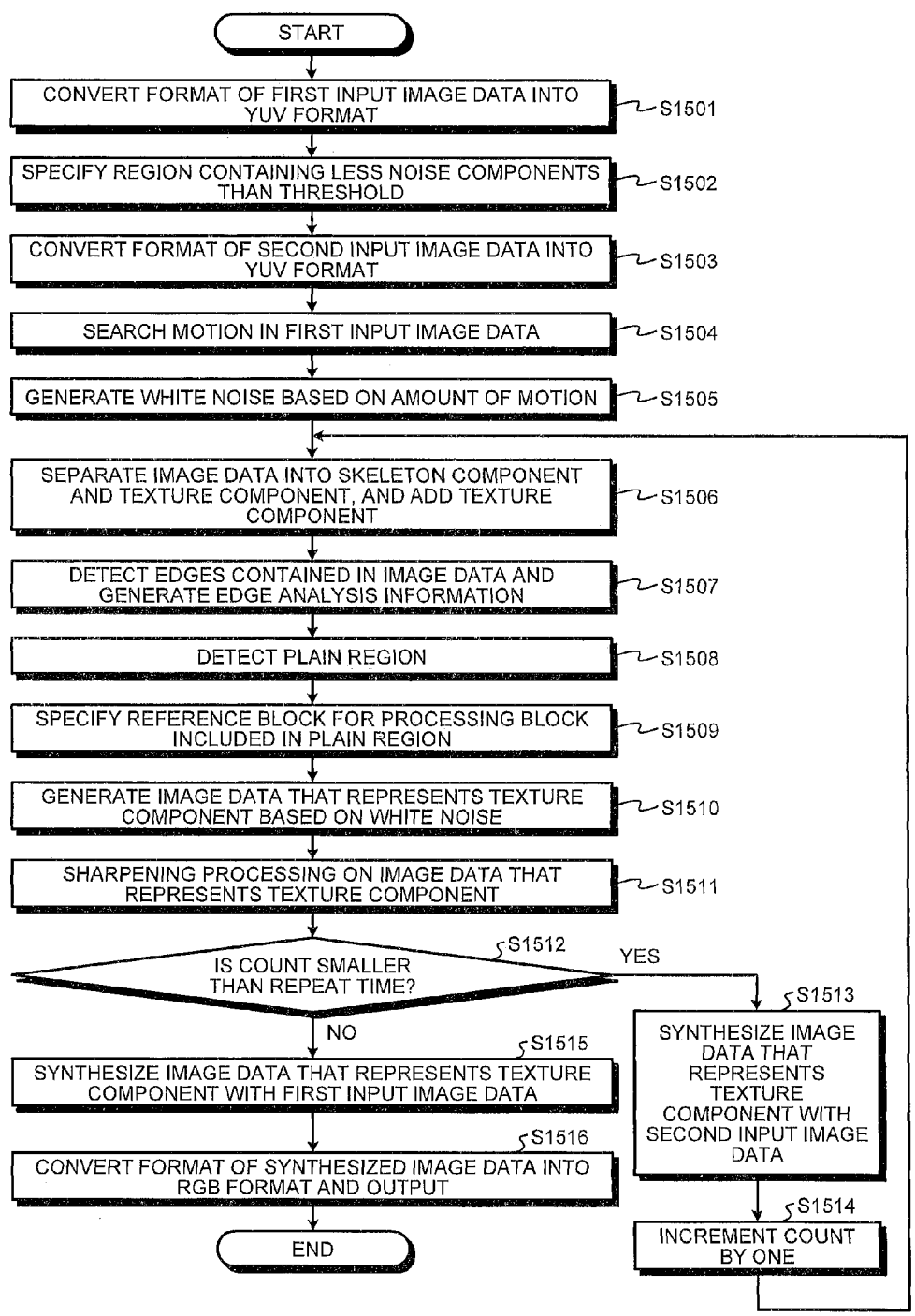
FIG. 15 is an exemplary flowchart illustrating the procedure of image processing in the image processor according to the fifth embodiment.

Described next is the image processing in the image processor 151 according to the fifth embodiment. FIG. 15 is a flowchart illustrating the procedure of the above-described processing in the image processor 151 according to the fifth embodiment. The initial value of a count (the number of times of repetition) is one.

The first input convertor 601 converts a format of the first input image data into YUV format (S1501).

The noise area specifying module 204 then analyzes noise contained in the regions of magnified input image data, and specifies a region containing noise components at least fewer than a threshold determined in advance (S1502).

The second input convertor 602 converts a format of the second input image data into YUV format (S1503).

The motion search module 604 searches motion between the first input image data and past first input image data, and obtains the amount of motion from the search result (S1504).

The white noise generator 605 generates white noise containing noise components sorted in accordance with the amount of motion (S1505).

The texture component processor 1302 separates received image data into a skeleton component and a texture component (S1506). In the fifth embodiment, as the received image data, the second input image data is used in the first time, and the image data synthesized at the image synthesizing module 1303 is used in and after the second time.

The detector 606 detects edges contained in the image data received from the texture component processor 1302, and generates edge analysis information (S1507).

The plainness detector 1001 detects a plain region from the regions included in the image data received from the texture component processor 1302 (S1508).

The block search module 1002 specifies a reference block for the plain region detected from the image data input from the texture component processor 1302 (S1509).

The texture generator 1003 shapes white noise on the basis of the edge analysis information obtained at the detector 606 and the block search module 1002, and generates image data that represents a texture component that is a high-frequency component (S1510). The texture component for a processing block in the plain region is generated by using the edge analysis information of the reference block.

The sharpening module 608 performs sharpening processing on the image data that represents the texture component (S1511).

The image synthesizing module 1303 determines whether the count is smaller than a parameter "Repeat Time" (S1512) If it is determined that the count is smaller than the parameter (Yes at S1512), the image synthesizing module 1303 synthesizes the image data that represents the texture component with the second input image data (S1513). The image synthesizing module 1303 increments the count by one (S1514), and the processing is repeated from the processing at S1506.

If the image synthesizing module 1303 determines that the count is not smaller than the parameter "Repeat Time", in other words, determines that the repeat processing is completed (No at S1512), the image synthesizing module 1303 synthesizes the image data that represents the texture component with the first input image data (S1515).

The output convertor 206 converts the format of the synthesized image data into RGB format, and outputs the image data (S1516).

In the fifth embodiment, in addition to the effects described in the first to the fourth embodiments, a texture component can be added to a wider region in the input image data than that in the fourth embodiment that has lost texture because of encoding or image-capturing by repeating the processing of adding a texture component to a plain region by using another region that is located near the plain region with respect to time and space and that keeps a texture pattern in the same object.

The first to the fifth embodiments describe an example of generating and adding a texture component in the television display device. However, generation of the texture component does not always take place in the television display device. A sixth embodiment describes an example of generating a texture component in a broadcast station device.

Figure 16:
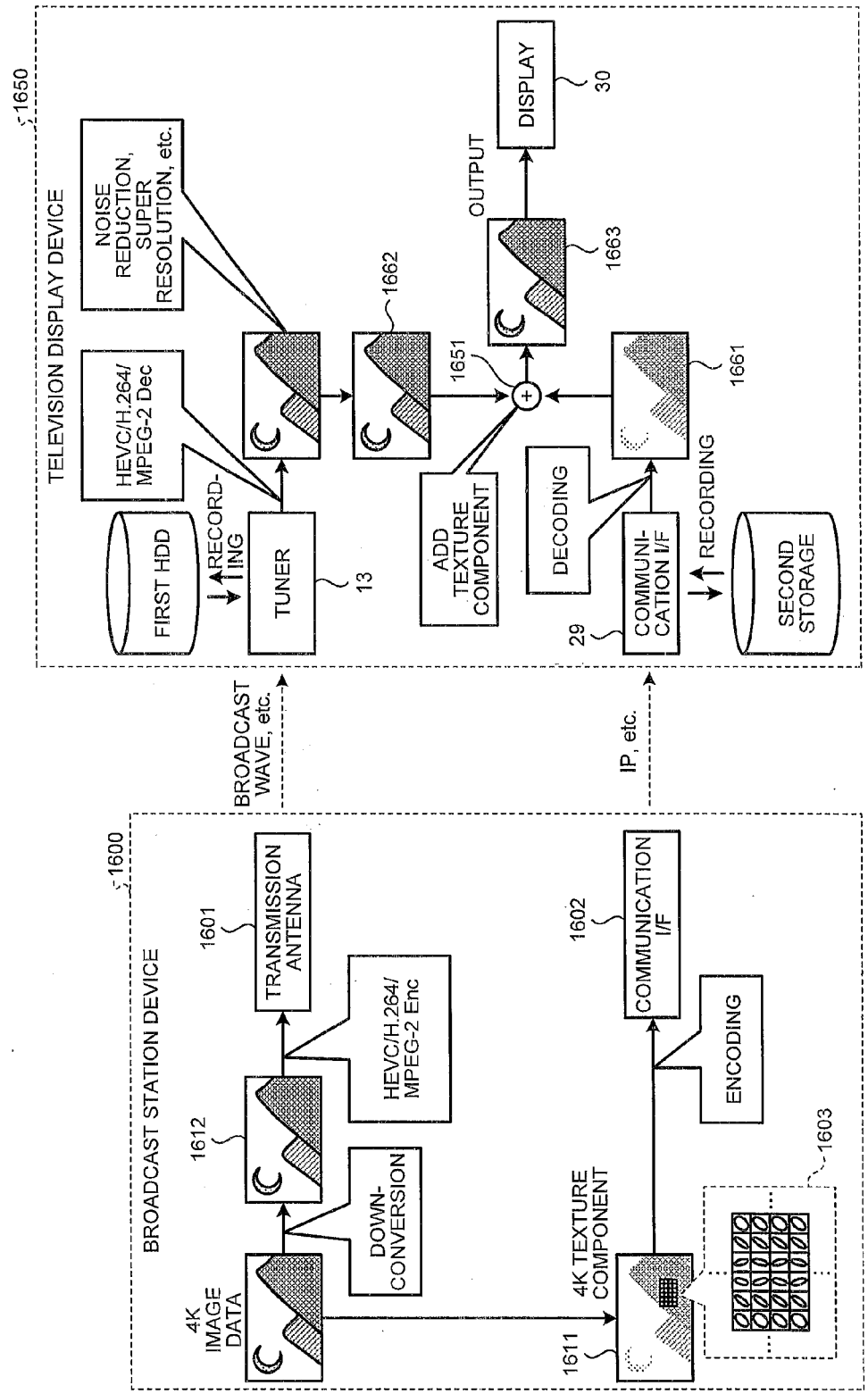
FIG. 16 is an exemplary diagram illustrating an example of processing relating to texture according to a sixth embodiment.

FIG. 16 is a diagram illustrating an example of processing relating to texture according to the sixth embodiment. As illustrated in FIG. 16, the configuration for the processing includes a broadcast station device 1600 and a television display device 1650. Although the sixth embodiment describes an example of using 4K image data, the display size of the image data is not limited to this.

As illustrated in FIG. 16, the broadcast station device 1600 down-converts 4K image data and generates image data 1612, encodes the image data 1612 by using an HEVC/H.264/MPEG-2 encoder, and transmits the image data to the television display device 1650 on, for example, a broadcast wave transmitted from, for example, a transmission antenna 1601.

The broadcast station device 1600 also generates, from the 4K image data, edge analysis information necessary for generating a 4K texture component 1611. The edge analysis information includes a texture orientation and skewness of gradient distribution for each processing block (for example, a processing block 1603). The broadcast station device 1600 transmits encoded edge analysis information from a communication I/F 1602 to the television display device 1650 via a public communication network using, for example, the Internet protocol (IP).

The television display device 1650 receives the 4K image data by the tuner 13. The television display device 1650 may record the received 4K image data in a first HDD. The television display device 1650 decodes the received 4K image data by using an HEVC/H.264/MPEG-2 decoder, and performs image processing such as noise reduction and super-resolution.

The television display device 1650 receives the encoded edge analysis information by the communication I/F 29. After the edge analysis information is decoded, a calculation module 1651 generates a texture component from the edge analysis information and adds this texture component 1661 to 4K image data 1662 after the image processing. The television display device 1650 outputs generated image data 1663 to the display 30.

Figure 17:
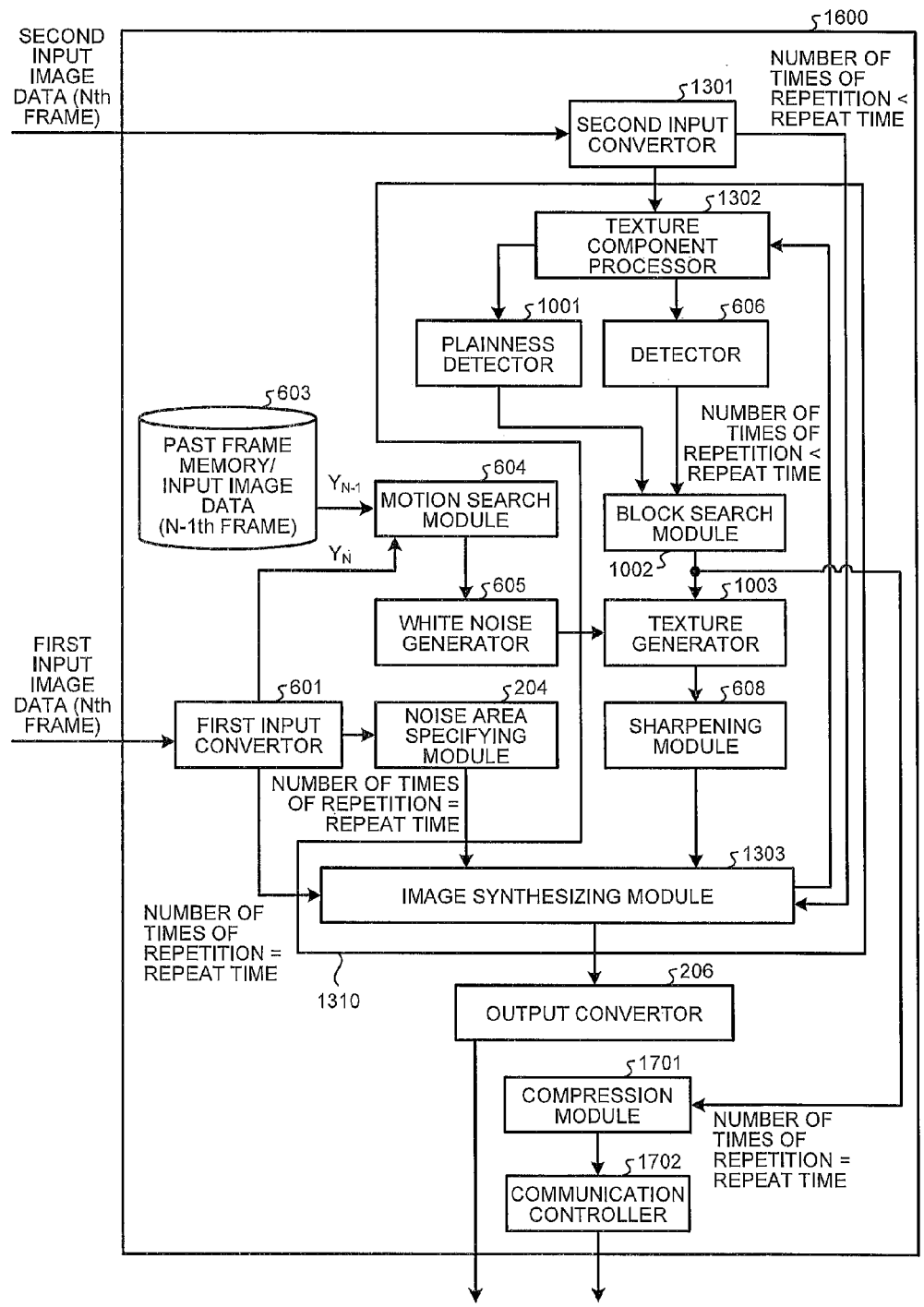
FIG. 17 is an exemplary diagram illustrating an example of functional configurations of a broadcast station device according to the sixth embodiment.

Described next is a configuration of the broadcast station device 1600. FIG. 17 is a diagram illustrating an example of functional configurations of the broadcast station device 1600 according to the sixth embodiment. The broadcast station device 1600 comprises the first input convertor 601, the second input convertor 1301, the past frame memory 603, the motion search module 604, the white noise generator 605, the texture component processor 1302, the detector 606, the plainness detector 1001, the block search module 1002, the texture generator 1003, the sharpening module 608, the noise area specifying module 204, the image synthesizing module 1303, the output convertor 206, a compression module 1701, and a communication controller 1702 as an electronic circuit that performs image processing on the digital video signal. The same reference signs are given to the same configurations as those in the first to the fifth embodiments, and the description thereof is omitted.

The broadcast station device 1600 also comprises a down-converter (not illustrated) for down-converting first input image data having a size of 4K (3840×2160), the HEVC/H.264/MPEG-2 encoder (not illustrated), and an I/F (not illustrated) for connecting to the transmission antenna 1601. The broadcast station device 1600 down-converts the first input image data by the down-converter and encodes it by the HEVC/H.264/MPEG-2 encoder, and transmits the down-converted and encoded first input image data to the television display device 1650 on, for example, a broadcast wave.

After the broadcast station device 1600 performs the processing of adding a texture component for the number of times of repetition (when the number of times of repetition reaches "Repeat Time"), the block search module 1002 selects edge analysis information for generating a texture component for each processing block, and outputs the edge analysis information for each processing block to the compression module 1701. The compression module 1701 compresses the edge analysis information for each processing block. The edge analysis information for each processing block according to the sixth embodiment is highly correlated with that in a nearby block with respect to time and space, and information compression is effective. Thus, the broadcast station device 1600 can reduce communication loads by compressing the edge analysis information. Although the sixth embodiment describes an example of compressing edge analysis information, the edge analysis information may not be compressed.

The edge analysis information for each processing block may be configured by a plurality of parameters (for example, a texture orientation θ and skewness of gradient distribution) for shaping white noise to generate a texture component. When the edge analysis information can be represented by, for example, three parameters for shaping noise components, the parameters may be converted into image information. Consequently, the broadcast station device 1600 can implement video coding. When the edge analysis information is configured by many parameters, the parameters are divided into groups of three parameters each, and the broadcast station device 1600 may perform video coding on each group of three parameters. Although the sixth embodiment describes an example of performing the block search at the block search module 1002 for a plurality of times as performed in the fifth embodiment, the broadcast station device 1600 according to the sixth embodiment may not perform the block search for a plurality of times as in the fourth embodiment.

The communication controller 1702 transmits the compressed edge analysis information to the television display device 1650.

Figure 18:
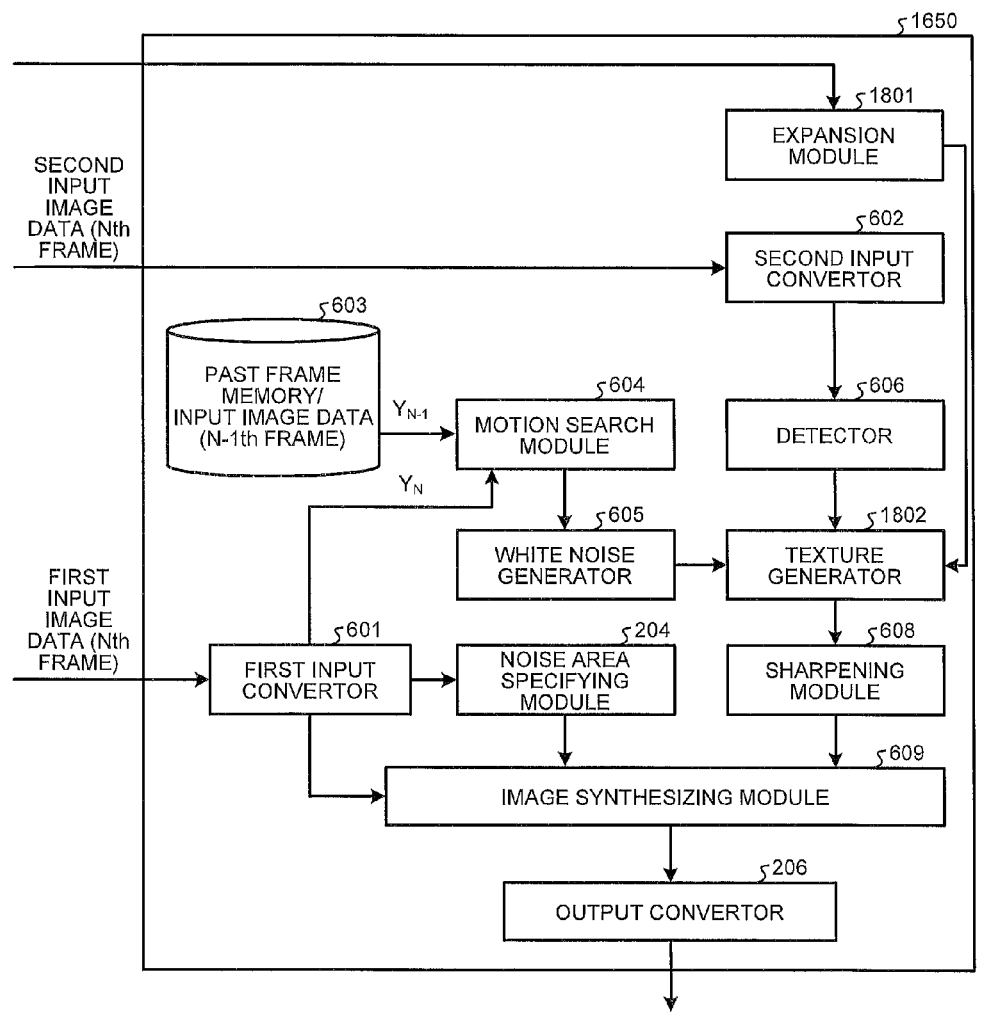
FIG. 18 is an exemplary diagram illustrating an example of functional configurations of a television display device according to the sixth embodiment.

Described next is the television display device 1650. FIG. 18 is a diagram illustrating an example of functional configurations of the television display device 1650 according to the sixth embodiment. The television display device 1650 comprises an expansion module 1801, the first input convertor 601, the second input convertor 602, the past frame memory 603, the motion search module 604, the white noise generator 605, the detector 606, a texture generator 1802, the sharpening module 608, the noise area specifying module 204, the image synthesizing module 609, and the output convertor 206 as an electronic circuit that performs image processing on the digital video signal. The same reference signs are given to the same configurations as those in the first to the fifth embodiments, and the description thereof is omitted.

In the sixth embodiment, the communication I/F 29 of the television display device 1650 receives encoded edge analysis information for each processing block. The expansion module 1801 expands the edge analysis information for each processing block.

The texture generator 1802 generates image data that represents a texture component that is a high-frequency component on the basis of the expanded edge analysis information for each processing block and white noise. The texture generator 1802 may use the expanded edge analysis information as it is, or may use expanded edge analysis information synthesized with the edge analysis information output from the detector 606. The edge analysis information is used, for example, to supplement a portion lacking edge analysis information or a portion including weak edge components of the expanded edge analysis information.

The television display device 1650 may store the received edge analysis information for each processing block, and may use it in reproducing recorded or redistributed image data. Although the sixth embodiment describes an example of receiving edge analysis information for each processing block, the information received by the television display device 1650 may be information that can be used in generating image data that represents a texture component that is a high-frequency component.

After the above-described processing, the television display device 1650 generates image data to which a texture component is added by the same procedure as is performed in the embodiments described above, and the television display device 1650 converts the format of the image data into RGB format, and outputs it to the display 30.

In addition to the effects of the first to the fifth embodiments described above, the broadcast station device 1600 according to the sixth embodiment can efficiently supply, to the television display device 1650, edge analysis information for each processing block generated by referring to image data high-frequency component of which has not largely deteriorated. Furthermore, it is possible to reproduce the texture component that has been lost in video compression for ordinary broadcast waves.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   circuitry configured to:
   receive first image data for displaying a first image that comprises a plurality of regions,
   modify a first region of the first image by adding at least a high-frequency component based on second image data, the first region of the first image including fewer noise components than a first threshold, and
   output third image data for displaying the first image that comprises the plurality of regions and the modified first region, wherein
   the first image data is a video image, and
   the second image data comprises at least a high-frequency component to be added to a part of the first image corresponding to the first region at a specific time when the first image data is generated based at least in part on
   (1) noise components including at least partial randomness, and
   (2) an edge component included in another region within a threshold distance of the first region of the first image at the specific time or within a threshold time period of the specific time.

2. The electronic device according to claim 1, wherein
   the edge component is included in the first region or the other region within the threshold distance of the first region of the first image at the specific time or within the threshold time period of the specific time, and
   the edge component is generated by image processing multiple times.

3. The electronic device according to claim 1, further comprising:
   a receiver configured to receive information for generating the second image data from an external device, wherein
   the circuitry is further configured to generate the second image data based on the information.

4. A method comprising:
   receiving first image data for displaying a first image that comprises a plurality of regions;
   modifying a first region of the first image by adding at least a high-frequency component based on second image data, the first region of the first image including fewer noise components than a first threshold; and
   outputting third image data for displaying the first image that comprises the plurality of regions and the modified first region, wherein
   the first image data is a video image, and
   the second image data comprises at least a high-frequency component to be added to a part of the first image corresponding to the first region at a specific time when the first image data is generated based at least in part on
   (1) noise components including at least partial randomness, and
   (2) an edge component included in another region within a threshold distance of the first region of the first image at the specific time or within a threshold time period of the specific time.

5. The method according to claim 4, wherein
   the edge component is included in the first region or the other region within the threshold distance of the first region of the first image at the specific time or within the threshold time period of the specific time, and
   the edge component is generated by image processing multiple times.

6. The method according to claim 4, further comprising:
   receiving information for generating the second image data from an external device, wherein
   the second image data is generated based on the information.

7. A computer program product comprising programmed instructions embodied in and stored on a non-transitory computer readable medium, wherein the instructions, when executed by a computer, cause the computer to at least perform:

receiving first image data for displaying a first image that comprises a plurality of regions;

modifying a first region of the first image by adding at least a high-frequency component based on second image data, the first region of the first image including fewer noise components than a first threshold; and outputting third image data for displaying the first image that comprises the plurality of regions and the modified first region, wherein the first image data is a video image, and the second image data comprises at least a high-frequency component to be added to a part of the first image corresponding to the first region at a specific time when the first image data is generated based at least in part on
(1) noise components including at least partial randomness, and
(2) an edge component contained in another region within a threshold distance of the first region of the first image at the specific time or within a threshold time period of the first time.

8. The computer program product according to claim 7, wherein the edge component is included in the first region or the other region within the threshold distance of the first region of the first image at the specific time or within the threshold time period of the specific time, and the edge component is generated by image processing multiple times.

9. The computer program product according to claim 7, wherein the instructions, when executed by the computer, further causes the computer to perform:

receiving information for generating the second image data from an external device, wherein the second image data is generated based on the information.

* * * * *